Aug. 16, 1932.   J. K. HODNETTE ET AL   1,872,293
TRANSFORMER
Filed June 5, 1931   2 Sheets-Sheet 1

INVENTORS.
John K. Hodnette and
Peter L. Bellaschi.
BY
ATTORNEY

Aug. 16, 1932.    J. K. HODNETTE ET AL    1,872,293
TRANSFORMER
Filed June 5, 1931    2 Sheets-Sheet 2

WITNESSES:

INVENTORS.
John K. Hodnette and
Peter L. Bellaschi.
BY
ATTORNEY

Patented Aug. 16, 1932

1,872,293

UNITED STATES PATENT OFFICE

JOHN K. HODNETTE AND PETER L. BELLASCHI, OF SHARON, PENNSYLVANIA, ASSIGNORS TO WESTINGHOUSE ELECTRIC AND MANUFACTURING COMPANY, A CORPORATION OF PENNSYLVANIA

TRANSFORMER

Application filed June 5, 1931. Serial No. 542,319.

Our invention relates to methods of and means for improving the electrostatic distribution of surge voltages in the windings of electrical apparatus.

In the windings of electrical apparatus, such as transformers, that are connected to a transmission line, the voltage between the terminals of a winding varies uniformly from one end of the winding to the other under normal frequency and voltage conditions of the system. However, during certain conditions of the system, such as may be caused by lightning or by switching operations on the transmission line, a high-voltage, high-frequency surge may occur on the transmission line and enter the winding of the transformer.

In windings of the usual construction, a voltage surge will not initially distribute itself along the winding in a manner to establish a uniform voltage gradient thereon, the end of the winding adjacent to the high-voltage terminal being required to withstand a much higher initial voltage between adjacent turns of the winding than between other portions of it. This initial voltage gradient results from the value of the electrostatic conditions existing between the winding and ground and between adjacent portions of the winding, such as different turns thereof.

Because of the inductance and distributed capacitance of the winding, a redistribution of the energy takes place, causing oscillations in the voltage values about the value corresponding to its final or uniformly distributed value. That is, the amplitude of the oscillations will initially correspond to the difference in the initial and final distribution of the voltage along the winding. This oscillation creates successive voltage stresses between adjacent parts of the winding and between the winding and ground.

It is an object of our invention to provide electrostatic shields, so positioned and dimensioned as to substantially neutralize the capacitance current to ground and to adjacent windings upon the occurrence of a rapid change in voltage across the winding of an electrical apparatus.

Another object of our invention is to provide means for protecting the winding of an electrical apparatus from the transient voltage distribution effect of a high-frequency surge entering the winding.

Another object of our invention is to provide shields in the space between high and low-voltage windings or between groups of said windings for supplying the capacity current between said windings or winding groups and between them and ground.

Referring to the drawings, Figure 1 is a cross sectional view of a transformer organized in accordance with one embodiment of our invention.

Figure 1:
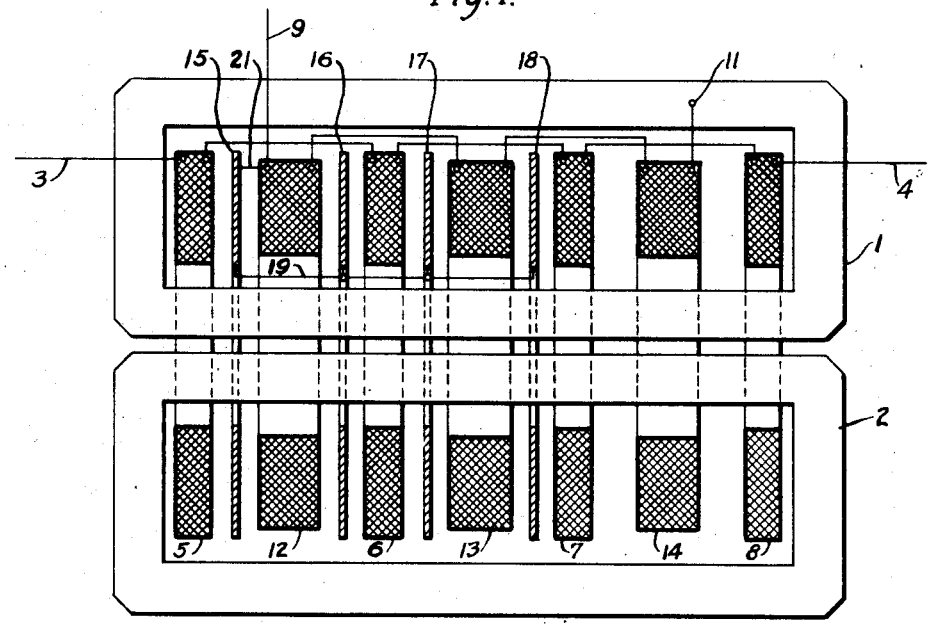
Figure 2:
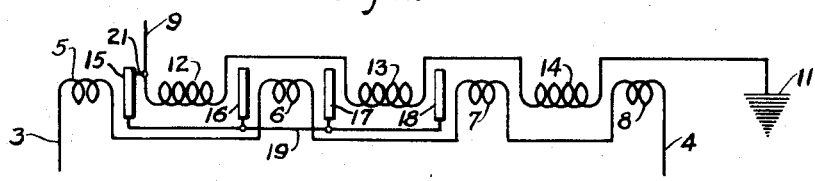
Fig. 2 is a diagrammatic view showing one arrangement of the coils, wherein a high-voltage element is introduced in the spaces between the main coil groups of the winding.

Referring to the drawings and particularly to Fig. 1 thereof, a core comprising structures 1 and 2, each forming a complete magnetic circuit, are shown, the two adjacent portions thereof forming the winding leg of the core structure.

The invention is illustrated as applied to a transformer employing interleaved windings, that is, windings divided into coil groups wherein groups of high-voltage coils are spaced between groups of low-voltage coils.

The low-voltage winding extends between the terminals 3 and 4, and comprises the low-voltage winding groups 5, 6, 7 and 8 that are connected in series-circuit relation.

Figure 7:
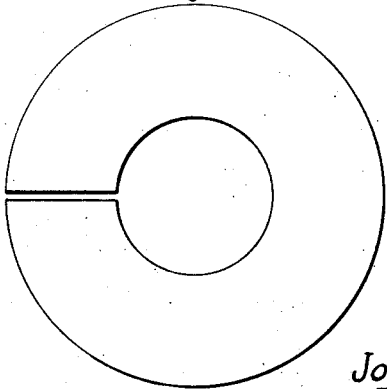
Fig. 7 is a plan view of one form of shielding element that may be employed.

The high-voltage winding extends between the high-voltage terminal 9 and a grounded terminal 11 and comprises the winding groups 12, 13 and 14 that are connected together in series-circuit relation. Shields 15, 16, 17 and 18, or the general shape shown in Fig. 7, are positioned in the "high-low" space between the first two high-voltage coil groups 12 and 13 and adjacent low-voltage groups 5, 6 and 7. The several shields 15, 16, 17 and 18 are connected together by means of conductor 19, and to the high-voltage terminal 9 by means of the conductor 21.

The presence of the shields 15, 16, 17 and 18 between the groups of the high and low-voltage windings, neutralized and supplies directly the capacitance current to ground and to the low-voltage winding group, thus eliminating the flow of this current from the high-voltage winding.

When a high voltage is suddenly applied to the high-voltage line terminal 9, the shields 15, 16, 17 and 18 that are directly connected to this line terminal are charged to the same voltage as the terminal itself, and a charging current is supplied, through the several shields, to the various parts of the winding groups and to ground. The various parts of the winding are, therefore, raised to a potential that is determined by the capacity through which the currents from the shields are required to flow and the capacity current through the winding proper. The shields and winding groups are so designed and positioned that the capacitance current from the different shields to the adjacent high-voltage coils varies with the voltage above and the capacity to ground of these coils. This result is accomplished by so proportioning the parts of the structure that the product of the voltage and the capacitance between the shields and the windings decrease in proportion as the capacitance current between the winding and ground decreases. The shielding structure may, therefore, be designed to maintain, at all times, a substantially uniform distribution of voltage throughout the high-voltage winding.

Figure 3:
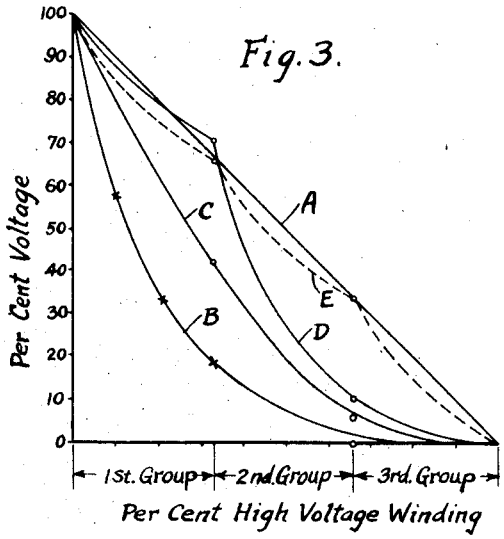
Fig. 3 is a diagram showing curves representing the distribution along a winding divided into three coil groups under different conditions of shielding.

Referring to Fig. 3, the curve A shows the distribution of voltage along the high-voltage winding which is a straight-line gradient, or represents a condition in which the voltage per turn is the same for all portions of the winding.

The curve B represents the initial voltage distribution along a transformer winding when no shielding is provided. It will be noted that, according to this curve, the first group, representing about one-third of the high-voltage winding, is required to withstand considerably more than one-half of the total voltage across the entire winding, thus placing a very high-voltage stress upon the insulation at the high-voltage end of the winding.

The curve C represents the initial distribution of surge voltage in a winding of the type illustrated in Fig. 1, in which the shields 15 and 16, adjacent to the high-voltage winding group 12 are provided, and shields 17 and 18 are omitted. It will be noted that the voltage gradient, with the amount of shielding indicated, is considerably improved.

The curve D represents the initial distribution of surge voltage when the shields 15, 16 and 17 only are employed, and the curve E represents the initial surge-voltage distribution when the shields 15, 16, 17 and 18 are all employed and connected to the high-voltage terminal 9.

Under certain conditions of service, complete shielding may not be required, for example, under service conditions wherein the voltage gradient represented by the curve C may not be excessive, shields 15 and 16 may be employed, resulting in a partial shielding of the transformer. Under more exacting conditions of service a greater number of shields may be used, such as the four shields illustrated in Fig. 1, or additional shields between the winding groups 7 and 14, and 14 and 8 may also be provided, if desired.

Figure 4:
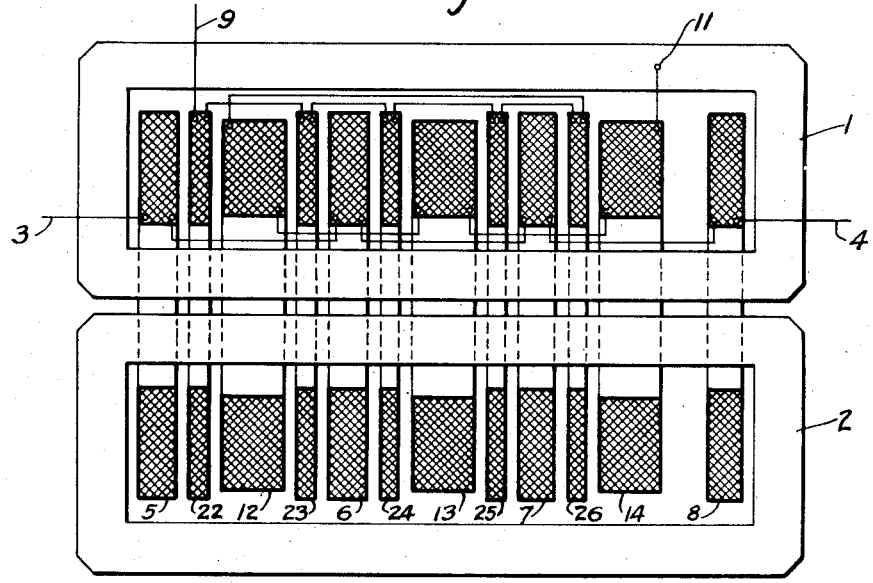
Fig. 4 is a cross sectional view of a transformer organized in accordance with a second modified form of the invention, wherein an auxiliary winding is employed as the shielding element and is positioned between the high and low-voltage windings or between coil groups thereof.
Figure 5:
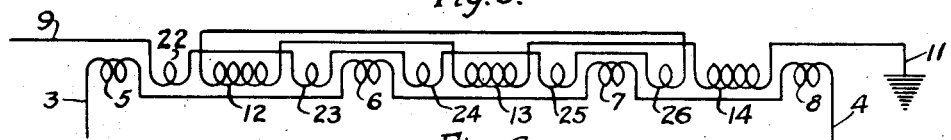
Figs. 5 and 6 are diagrammatic views showing different connections for the windings shown in Fig. 4.
Figure 6:
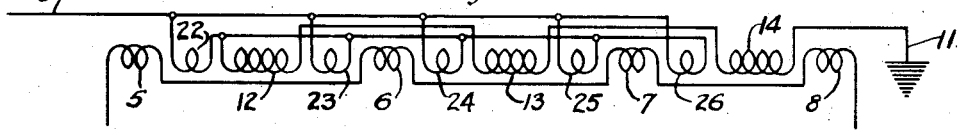

Referring to the invention illustrated in Figs. 4, 5 and 6 of the drawings, auxiliary windings 22, 23, 24, 25 and 26 of very low resistance and having a very small number of turns may be positioned in the high-low spaces between the main groups 12, 13 and 14 of the high-voltage winding and the adjacent groups of the low-voltage winding.

The several auxiliary windings 22 to 26 inclusive are connected together in series or in multiple between the high-voltage terminal 9 and the first high-voltage group 12. Since the auxiliary windings are of very low impedance, there is practically no voltage drop across them, and the voltage applied to the high-voltage side of the group 12 is substantially the voltage of the terminal 9, the several auxiliary windings having a voltage corresponding to that of the terminal 9 and acting to provide the capacitance current to ground, in the same maner as the shields 15, 16, 17 and 18, as shown in Fig. 1.

The auxiliary windings may be connected either in the manner shown in Fig. 5 or as shown in Fig. 6. In Fig. 5, the circuits lead from the high-voltage terminal 9, in order, through the auxiliary windings 22, 23, 24, 25 and 26, to the high-voltage coil group 12, continuing through the high-voltage winding groups 13 and 14, to ground. In Fig. 6, the line terminal 9 is connected to the several auxiliary windings 26, 25, 24, 23 and 22 which are connected in parallel with each other and in series with the high-voltage winding.

It will be apparent that the same principle of shielding may be utilized where a single high-voltage winding group and a single low-voltage winding group are employed with the use of either disk or flat coils. The shields, in either case, being employed to supply the capacitance current to ground and being positioned in the space between the high-voltage winding and low-voltage winding.

Since many modifications may be made in the structures illustrated without departing from the spirit of our invention, we do not wish to be limited otherwise than by the scope of the appended claims.

We claim as our invention:

1. An electrical transformer comprising a low-voltage winding group of coils, a high-voltage winding group of coils spaced therefrom, and means for protecting said windings from the effect of high-frequency energy comprising a shield in the space between the windings and connected to one terminal of the high-voltage winding.

2. An electrical transformer comprising a low-voltage winding, a high-voltage winding spaced therefrom and inductively related thereto, and means for introducing into the space between said windings a voltage that is substantially the terminal voltage of the high-voltage winding.

3. An electrical transformer comprising a low-voltage winding, a high-voltage winding spaced therefrom and inductively related thereto, and means in the space between said windings having a voltage that is substantially the voltage of the terminal of the high-voltage winding for protecting said windings from the effect of high-frequency energy.

4. An electrical transformer comprising a low-voltage winding and a high-voltage winding spaced therefrom and inductively related thereto, and means for protecting said windings from the effect of high-frequency comprising a low-resistance winding turn located in the space between said windings and connected between the high-voltage winding and a line conductor.

5. The combination in an electrical winding comprising a plurality of spaced groups of coils, of means for protecting said winding from the effect of high-frequency energy comprising conducting members in the spaces between, and spaced from, said winding groups and connected to the terminal of the winding.

6. The combination in an electrical winding comprising a plurality of spaced groups of coils, of means for protecting said winding from the effect of high-frequency energy comprising shields connected to the end of the winding and positioned in the spaces between said groups of coils.

7. The combination, in an electrical winding comprising a plurality of spaced groups of coils, of means for protecting said winding from the effect of high-frequency energy comprising shielding coils in the spaces between said winding groups, said shielding coils each consisting of a wide flat conductor having at least one turn, said several shielding coils being connected in series with said winding and to the line terminal.

8. Electrical induction apparatus having spaced groups of winding turns connected in series between a grounded terminal and a high voltage terminal, and electrostatic shields positioned between said groups of turns and electrically connected to the high voltage terminal.

9. Electrical induction apparatus having spaced groups of winding turns connected in series between a grounded terminal and a high voltage terminal, and electrostatic shields positioned adjacent parts of said groups of turns and connected to establish electrostatic potentials higher than that of the adjacent winding parts, to thereby decrease the static stress and substantially to prevent the flow of charging current from said parts through the surrounding dielectric.

10. The combination, in an electrical winding comprising a plurality of spaced groups of coils connected in series between a grounded terminal and a high voltage terminal, of means for protecting said winding from the effect of surge voltages comprising shields positioned in the spaces between said coil groups, and means for connecting said shields to a source of voltage sufficiently high in value to substantially prevent the flow of charging current from said coil group ends to ground.

11. In combination, a high tension electrical winding comprising a plurality of spaced coil groups connected in series between a grounded terminal and a high voltage terminal, a low tension electrical winding comprising a plurality of coil groups positioned along the axis and adjacent the ends of the several coil groups of the high tension winding, electrostatic shields positioned in the spaces between certain of said high voltage and low voltage coil groups, and means independent of said windings for charging said shields to substantially prevent the flow of charging current between said coil groups.

12. In combination, a high tension electrical winding comprising a plurality of spaced coil groups connected in series between a grounded terminal and a high voltage terminal, a low tension electrical winding comprising a plurality of coil groups positioned along the axis and adjacent the ends of the several coil groups of the high tension winding, metallic shields positioned in the electrostatic field between certain of said high voltage and low voltage coil groups, and means for charging said shields sufficiently to relieve the static stress and thereby prevent the flow of charging current from said high voltage to said low voltage coil groups.

In testimony whereof, we have hereunto subscribed our names this 26th day of May, 1931.

JOHN K. HODNETTE.
PETER L. BELLASCHI.